Jan. 22, 1929.  F. A. BIENVENU  1,699,869

BAKING UTENSIL

Filed July 30, 1927

Inventor
F. A. Bienvenu
by E. J. Featherstonhaugh
Attorney

Patented Jan. 22, 1929.

1,699,869

UNITED STATES PATENT OFFICE.

FRANK ACHILLE BIENVENU, OF MONTREAL, QUEBEC, CANADA, ASSIGNOR, BY MESNE ASSIGNMENTS, TO CATELLI MACARONI PRODUCTS CORPORATION LIMITED, OF MONTREAL, CANADA.

BAKING UTENSIL.

Application filed July 30, 1927. Serial No. 209,547.

The invention relates to a baking utensil, as described in the present specification and illustrated in the accompanying drawings that form part of the same.

The invention consists essentially of the novel features of construction pointed out in the claim for novelty following a description containing an explanation in detail of an acceptable form of the invention.

The objects of the invention are to afford every opportunity possible for the circulation of air under and around about the pot during baking operations, particularly in brick ovens used for baking beans and other commodities cooked in vessels; to insure the thorough cooking of the food without burning the same and thereby avoid waste of good material; and generally to provide a reliable, efficient and durable cooking vessel.

Figure 1:
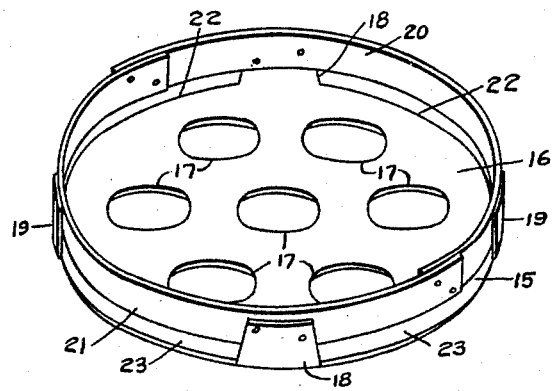

In the drawings, Figure 1 is a perspective view of a pot holder.

Figure 2:
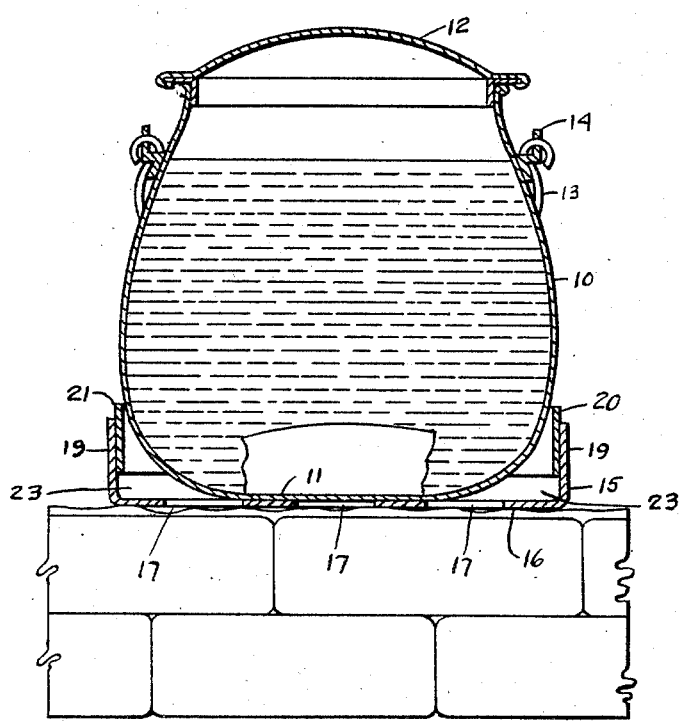

Figure 2 is a vertical sectional view showing pot and pot holder in a baking oven.

Like numerals of reference indicate corresponding parts in the various figures.

Referring to the drawings, the pot indicated by the numeral 10 is in the form of an iron bowl bellied out at the sides and curving inwardly to a substantially flat central portion 11 of the bottom.

The lid 12 of the pot is flanged as customary and fits into the pot and the bail 13 is secured to the lugs 14.

The holder 15 is formed of sheet metal and has the bottom 16 perforated to form the air holes 17 and upwardly turned at diametrically opposite places to form the lugs 18 and 19. These lugs 18 and 19 are joined circumferentially by the strips 20 and 21 and with the latter constitute the side walls of the holder having the open spaces or slots 22 and 23 immediately above the bottom perforated disc of the holder.

In use the pot is put in the holder and the latter on the oven floor, which is here shown as a brick baking oven as the natural inequalities of the brick floor surface materially assists in the successful operation of this invention for the air more readily finds its way under the bottom disc and through the perforations in said disc under, around and about the pot.

It will be seen that in baking particularly by the hot brick method the air materially aids in avoiding the scorching of the food as will readily be seen in the illustration where pork and beans are seen in the process of baking the pork being in the bottom of the pot. This utensil for the specific use in baking pork and beans has been found of great benefit in avoiding waste from burning and in maintaining and retaining the flavor of the beans and pork.

What I claim is:—

A baking utensil comprising a pan having a plurality of upstanding lugs and openings through the bottom thereof, a heat deflecting ring rigidly secured to said lugs and spaced from said pan and a pot having a bellied bottom resting on said pan and engaging said deflecting ring.

Signed at Montreal, Canada, this 7th day of July 1927.

FRANK ACHILLE BIENVENU.